US008576440B2

United States Patent
Sakiyama et al.

(10) Patent No.: US 8,576,440 B2
(45) Date of Patent: Nov. 5, 2013

(54) IMAGE PROCESSING SYSTEM, APPARATUS, METHOD, AND COMPUTER READABLE RECORDING MEDIUM RECORDED WITH IMAGE PROCESSING PROGRAM FOR FORMING AN IMAGE OF A STRUCTURED DOCUMENT WITHOUT LOSING A MOVING IMAGE INCLUDED IN THE STRUCTURED DOCUMENT

(75) Inventors: Daisuke Sakiyama, Kawanishi (JP); Mitsuzo Iwaki, Osaka (JP); Kenichi Takahashi, Sennan-gun (JP); Takeshi Minami, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 730 days.

(21) Appl. No.: 12/740,573

(22) PCT Filed: Aug. 17, 2009

(86) PCT No.: PCT/JP2009/003905
§ 371 (c)(1),
(2), (4) Date: Apr. 29, 2010

(87) PCT Pub. No.: WO2010/038348
PCT Pub. Date: Apr. 8, 2010

(65) Prior Publication Data
US 2010/0238471 A1  Sep. 23, 2010

(30) Foreign Application Priority Data
Sep. 30, 2008 (JP) .................. 2008-254932

(51) Int. Cl.
*G06K 1/00* (2006.01)
*G06K 9/54* (2006.01)
*G06F 17/00* (2006.01)

(52) U.S. Cl.
USPC ......... 358/1.9; 358/1.15; 358/1.11; 358/1.13; 358/1.18; 382/305; 715/202

(58) Field of Classification Search
None
See application file for complete search history.

(56) References Cited

U.S. PATENT DOCUMENTS 6,091,518 A * 7/2000 Anabuki ................. 358/500
2002/0036788 A1 * 3/2002 Hino ..................... 358/1.11
(Continued)

FOREIGN PATENT DOCUMENTS

| JP | 2000-343784 A | 12/2000 |
| JP | 2005346256 | * 12/2005 |

(Continued)

OTHER PUBLICATIONS

International Search Report (PCT/ISA/210) dated Nov. 10, 2009.

*Primary Examiner* — Steven Kau
(74) *Attorney, Agent, or Firm* — Buchanan Ingersoll & Rooney PC

(57) ABSTRACT

In order to form an image without losing a moving image included in a structured document, an MFP, when forming an image, receives print data and a moving image from a PC, stores the moving image in association with second moving image identification information, embeds, in a still image included in the print data, the second moving image identification information for the stored moving image and positional information included in the print data, and forms the still image on a sheet of paper. When reading an image, the MFP 100 reads a still image formed on a sheet of paper (S71), extracts second moving image identification information and positional information from the read still image (S73, S75), acquires a moving image identified by the extracted second moving image identification information (S74), and generates a structured document in which the moving image is associated with the still image in such a manner that the moving image is displayed at a position specified by the positional information in the still image (S89).

14 Claims, 9 Drawing Sheets

(56) References Cited

U.S. PATENT DOCUMENTS

| | | | |
|---|---|---|---|
| 2004/0247205 A1* | 12/2004 | Nagaya et al. | 382/305 |
| 2005/0128516 A1* | 6/2005 | Tomita | 358/1.15 |
| 2007/0002369 A1* | 1/2007 | Inoue | 358/1.15 |
| 2007/0097431 A1* | 5/2007 | Matsuda et al. | 358/1.15 |
| 2009/0228508 A1* | 9/2009 | Date et al. | 707/102 |

FOREIGN PATENT DOCUMENTS

| | | |
|---|---|---|
| JP | 2006-72648 A | 3/2006 |
| JP | 2007-80154 A | 3/2007 |
| JP | 2007-83663 A | 4/2007 |
| JP | 2007-288347 A | 11/2007 |

* cited by examiner

IMAGE PROCESSING SYSTEM, APPARATUS, METHOD, AND COMPUTER READABLE RECORDING MEDIUM RECORDED WITH IMAGE PROCESSING PROGRAM FOR FORMING AN IMAGE OF A STRUCTURED DOCUMENT WITHOUT LOSING A MOVING IMAGE INCLUDED IN THE STRUCTURED DOCUMENT

TECHNICAL FIELD

The present invention relates to an image processing system, an image processing apparatus, an image processing method, and an image processing program. More particularly, the present invention relates to an image processing system, an image processing apparatus, an image processing method, and a computer readable recording medium recorded with an image processing program, which are for processing a structured document.

BACKGROUND ART

Recently, a structured document in which a moving image can be embedded is known. There are various types of structured documents, which include those written in a markup language such as hypertext markup language (HTML) or extensible markup language (XML), and those written in portable document format (PDF). Such a structured document can be displayed on a display, but cannot be formed as an image on a recording medium such as a sheet of paper, because it includes a moving image. Japanese Patent Application Laid-Open No. 2007-80154 discloses an apparatus for drawing a structured document which enables drawing by transforming one frame of a motion picture or animation included in the structured document into a still picture. The apparatus is characterized in that it describes at least one frame position or frame area that can be transformed into a still picture in the structured document and selects an arbitrary frame from within the frame positions or frame areas to transform it into the still picture, to thereby draw the structured document.

With this technique, however, only one of a plurality of frames included in a moving image is drawn on a sheet of paper on which the structured document is drawn; the other frames in the moving image are lost.

Japanese Patent Application Laid-Open No. 2007-83663 discloses an image forming apparatus which forms an image in an image forming medium having a storage medium embedded therein. The apparatus is characterized in that it includes motion picture data writing means for writing motion picture data in the storage medium, still image clipping means for clipping a predetermined still image from the motion picture data, and image generating means for forming on the image forming medium the still image clipped by the still image clipping means.

With this technique, a moving image is stored in a recording medium embedded in a sheet of paper. Although the moving image would not be lost, a sheet of special paper having the recording medium embedded therein needs to be used, leading to an increased cost.

[Patent Document 1] Japanese Patent Application Laid-Open No. 2007-80154

[Patent Document 2] Japanese Patent Application Laid-Open No. 2007-83663

DISCLOSURE OF THE INVENTION

Problems to be Solved by the Invention

The present invention has been accomplished in view of the foregoing problems, and an object of the present invention is to provide an image processing system which can form an image of a structured document without losing a moving image included in the structured document.

Another object of the present invention is to provide an image processing apparatus which can form an image of a structured document without losing a moving image included in the structured document.

A further object of the present invention is to provide an image processing method which enables formation of an image of a structured document without losing a moving image included in the structured document.

A still further object of the present invention is to provide a computer readable recording medium recorded with an image processing program which enables formation of an image of a structured document without losing a moving image included in the structured document.

Means for Solving the Problems

To achieve the above-described objects, according to an aspect of the present invention, an image processing system includes an image processing apparatus and a control apparatus for controlling the image processing apparatus, wherein the control apparatus includes: a structured document acquiring portion to acquire a structured document including a moving image; a print data generating portion to generate print data, the print data including a still image on which one frame selected from among a plurality of frames included in the moving image is arranged at a position, in a display image for displaying the acquired structured document, where the moving image is displayed, positional information indicating a position within the still image where the frame is arranged, and moving image identification information for identifying the moving image; and a transmitting portion to transmit the generated print data and the moving image to the image processing apparatus, and wherein the image processing apparatus includes, in relation to image forming: a receiving portion to receive the print data and the moving image from the control apparatus; a storing portion to store the received moving image in association with the moving image identification information included in the print data; an embedding portion to embed, in a still image included in the received print data, the moving image identification information for the stored moving image and the positional information included in the received print data; and an image forming portion to form the still image on a recording medium, and the image processing apparatus further includes, in relation to image reading: a reading portion to read the still image formed on the recording medium; an extracting portion to extract the moving image identification information and the positional information from the read still image; a moving image acquiring portion to acquire a moving image identified by the extracted moving image identification information; and a reconfiguration portion to generate a structured document in which the acquired moving image is associated with the read still image in such a manner that the moving image is displayed at a position, in the still image, that is specified by the extracted positional information.

According to another aspect of the present invention, an image processing apparatus includes: a structured document acquiring portion to acquire a structured document including a moving image; a storing portion to store the moving image included in the acquired structured document by attaching thereto moving image identification information for identifying the moving image; a still image generating portion to generate a still image on which one frame selected from among a plurality of frames included in the moving image is arranged at a position, in a display image for displaying the acquired structured document, where the moving image is displayed; an embedding portion to embed, in the generated still image, the moving image identification information and positional information indicating a position within the still image where the frame is arranged; an image forming portion to form the still image on a recording medium; a reading portion to read the still image formed on the recording medium; an extracting portion to extract the moving image identification information and the positional information from the read still image; a moving image acquiring portion to acquire a moving image identified by the extracted moving image identification information; and a reconfiguration portion to generate a structured document in which the acquired moving image is associated with the read still image in such a manner that the moving image is displayed at a position, in the still image, that is specified by the extracted positional information.

According to a further aspect of the present invention, an image processing method includes the steps of: acquiring a structured document including a moving image; storing the moving image included in the acquired structured document; generating a still image on which one frame selected from among a plurality of frames included in the moving image is arranged at a position, in a display image for displaying the acquired structured document, where the moving image is displayed; embedding, in the generated still image, the moving image identification information and positional information indicating a position within the still image where the frame is arranged; forming the still image on a recording medium; reading the still image formed on the recording medium; extracting the moving image identification information and the positional information from the read still image; acquiring a moving image identified by the extracted moving image identification information; and generating a structured document in which the acquired moving image is associated with the read still image in such a manner that the moving image is displayed at a position, in the still image, that is specified by the extracted positional information.

According to a still further aspect of the present invention, a computer readable recording medium recorded with an image processing program causes a computer to perform the steps of: acquiring a structured document including a moving image; storing the moving image included in the acquired structured document; generating a still image on which one frame selected from among a plurality of frames included in the moving image is arranged at a position, in a display image for displaying the acquired structured document, where the moving image is displayed; embedding, in the generated still image, the moving image identification information and positional information indicating a position within the still image where the frame is arranged; forming the still image on a recording medium; reading the still image formed on the recording medium; extracting the moving image identification information and the positional information from the read still image; acquiring a moving image identified by the extracted moving image identification information; and generating a structured document in which the acquired moving image is associated with the read still image in such a manner that the moving image is displayed at a position, in the still image, that is specified by the extracted positional information.

BEST MODES FOR CARRYING OUT THE INVENTION

Figure 1:
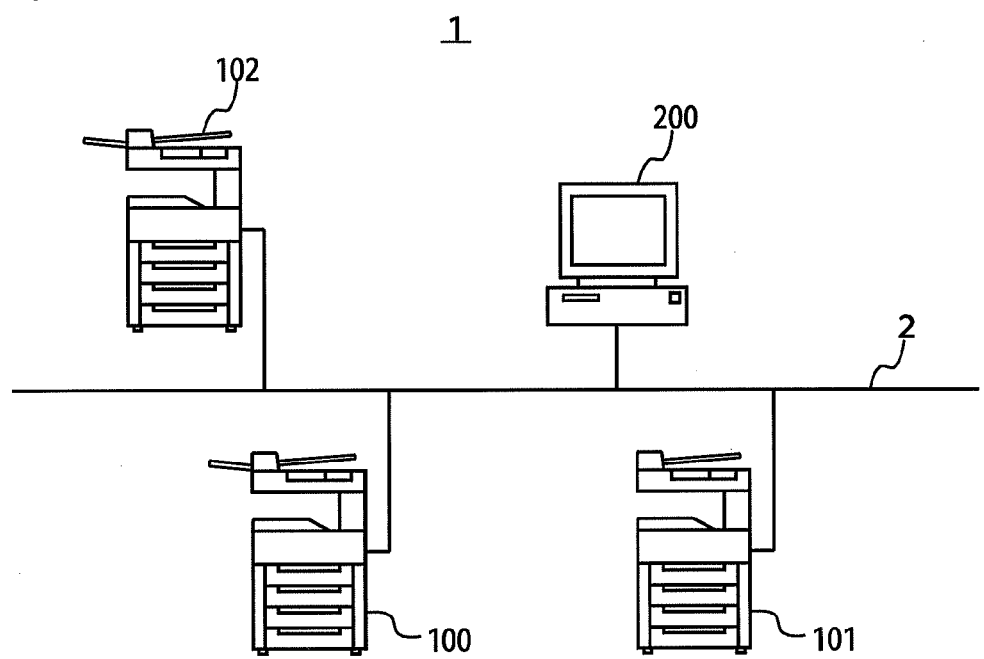
FIG. 1 schematically shows an image processing system according to an embodiment of the present invention.

Embodiments of the present invention will now be described with reference to the drawings. In the following description, like reference characters denote like parts, which have like names and functions, and therefore, detailed description thereof will not be repeated.

FIG. 1 schematically shows an image processing system according to an embodiment of the present invention. Referring to FIG. 1, an image processing system 1 includes multi function peripherals (MFPs) 100, 101, and 102, each of which functions as an image processing apparatus, and a personal computer (hereinafter, referred to as "PC") 200 which functions as a control apparatus controlling MFPs 100, 101, and 102. MFPs 100, 101, 102, and PC 200 are each connected to a network 2.

Network 2 is a local area network (LAN), which is connected to the Internet via a gateway. Network 2 may be connected in a wired or wireless manner. Network 2 is not necessarily the LAN; it may be a network using public switched telephone networks (PSTN), a wide area network (WAN), or the Internet.

PC 200 is a typical computer. PC 200 has installed therein a driver program for controlling MFPs 100, 101, and 102, and a browsing program for downloading a Web page stored in a Web server. Therefore, PC 200 can transmit print data to MFP 100, 101, or 102 to cause it to form an image of the print data. Furthermore, PC 200 can download a Web page written in a markup language such as HTML or XML from a Web server connected to the Internet, or data in the PDF format, for displaying or printing the same. The Web page written in a markup language or the data in the PDF format is a structured document. The structured document which can be processed by PC 200 is not necessarily the Web page written in a markup language or the data in portable document format (PDF); it may include data in XML paper specification (XPS) format or the like.

MFPs 100, 101, and 102 each include a scanner device for reading an original, and an image forming device and a facsimile device for forming an image on a recording medium such as a sheet of paper based on image data, and have the image reading function, copying function, and facsimile transmitting/receiving function. MFPs 100, 101, and 102 are identical in terms of configuration and function, and therefore, MFP 100 will be described representatively, unless otherwise stated.

Figure 2:
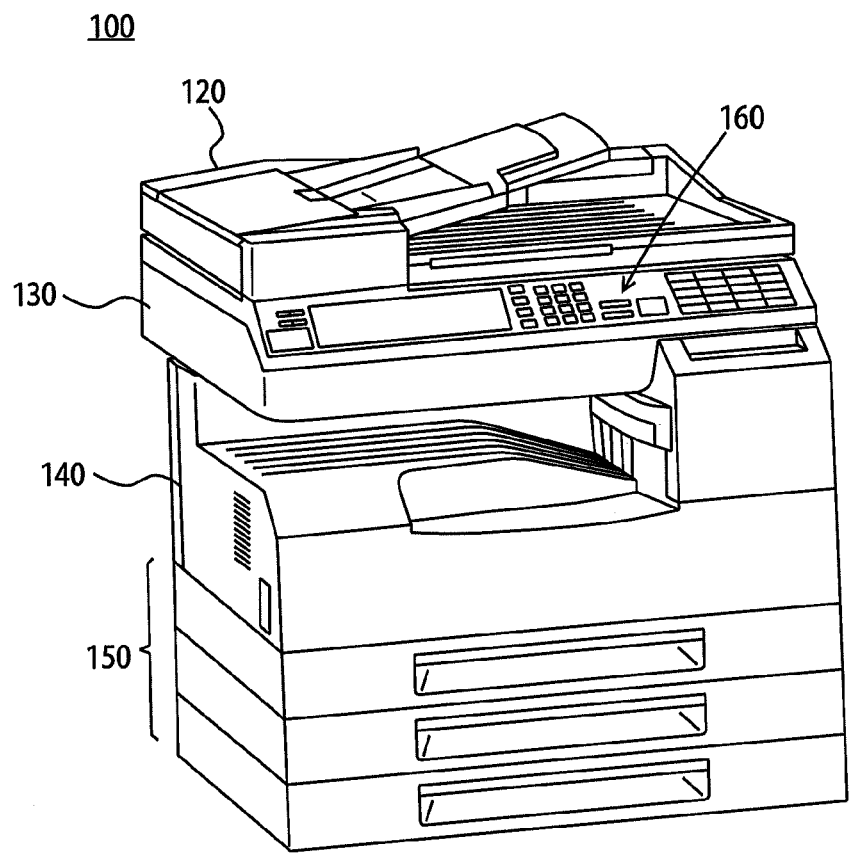
FIG. 2 is a perspective view of an MFP.
Figure 3:
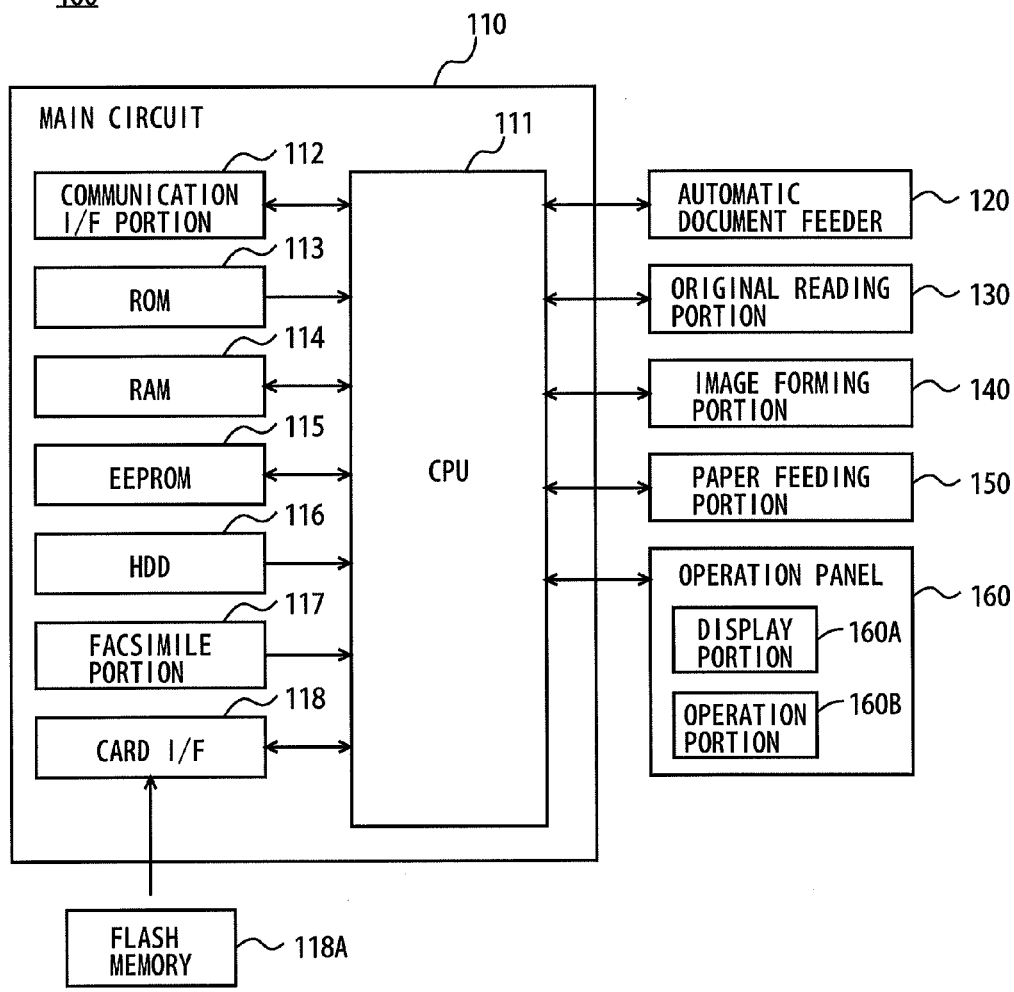
FIG. 3 is a block diagram showing, by way of example, the hardware configuration of the MFP.

FIG. 2 is a perspective view of the MFP, and FIG. 3 is a block diagram showing, by way of example, the hardware configuration of the MFP. Referring to FIGS. 2 and 3, MFP 100 includes: a main circuit 110; an original reading portion 130 which reads an original; an automatic document feeder 120 which carries an original into original reading portion 130; an image forming portion 140 which forms, on a sheet of paper or the like, a still image which is output from original reading portion 130 after being read thereby from an original; a paper feeding portion 150 which supplies a sheet of paper to image forming portion 140; and an operation panel 160 serving as a user interface. Main circuit 110 includes a CPU 111, a communication interface (I/F) portion 112, a ROM 113, a RAM 114, an electronically erasable and programmable ROM (EEPROM) 115, a hard disk drive (HDD) 116 as a mass storage, a facsimile portion 117, and a card interface (I/F) 118 mounted with a flash memory 118A. CPU 111 is connected with automatic document feeder 120, original reading portion 130, image forming portion 140, paper feeding portion 150, and operation panel 160, and is responsible for overall control of MFP 100.

ROM 113 stores a program executed by CPU 111 or data necessary for execution of the program. RAM 114 is used as a work area when CPU 111 executes a program. Further, RAM 114 temporarily stores still images continuously transmitted from original reading portion 130.

Operation panel 160, which is provided on an upper surface of MFP 100, includes a display portion 160A and an operation portion 160B. Display portion 160A is a display such as a liquid crystal display (LCD) or an organic electroluminescence display (ELD), and displays an instruction menu for a user, information about acquired image data, and others. Operation portion 160B, which is provided with a plurality of keys, accepts input data such as instructions, characters, and numerical characters, according to the key operations by the user. Operation portion 160B further includes a touch panel provided on display portion 160A.

Communication I/F portion 112 is an interface for connecting MFP 100 to network 2. CPU 111 communicates with MFP 101 or 102, or PC 200 via communication I/F portion 112, for transmission/reception of data. Further, communication I/F portion 112 is capable of communicating with a computer connected to the Internet via network 2.

Facsimile portion 117 is connected to public switched telephone networks (PSTN), and transmits facsimile data to or receives facsimile data from the PSTN. Facsimile portion 117 stores the received facsimile data in HDD 116, or outputs it to image forming portion 140. Image forming portion 140 prints the facsimile data received by facsimile portion 117 on a sheet of paper. Further, facsimile portion 117 converts the data stored in HDD 116 to facsimile data, and transmits it to a facsimile machine connected to the PSTN.

Card I/F 118 is mounted with flash memory 118A. CPU 111 is capable of accessing flash memory 118A via card I/F 118. CPU 111 loads RAM 114 with a program which is recorded on flash memory 118A mounted to card I/F 118, for execution. It is noted that the program executed by CPU 111 is not restricted to the program recorded on flash memory 118A. CPU 111 may load RAM 114 with the program stored in HDD 116 for execution. In this case, another computer connected to network 2 may rewrite the program stored in HDD 116 of MFP 100, or may additionally write a new program therein. Further, MFP 100 may download a program from another computer connected to network 2, and store the program in HDD 116. As used herein, the "program" includes, not only the program which CPU 111 can execute directly, but also a source program, a compressed program, an encrypted program, and others.

Figure 4:
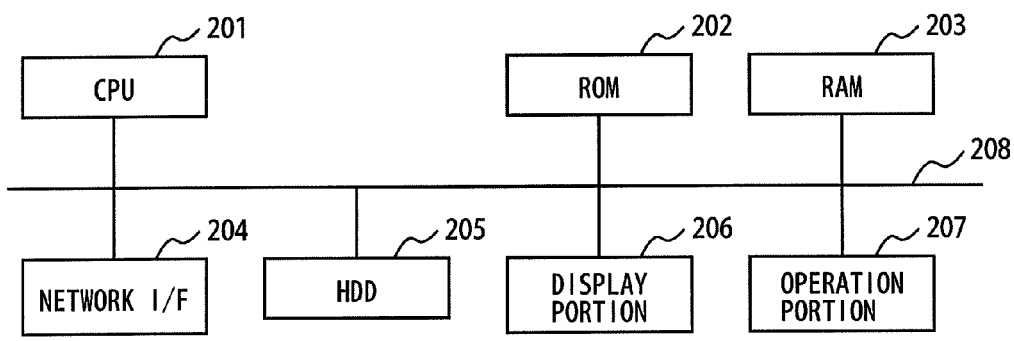
FIG. 4 is a block diagram showing, by way of example, the hardware configuration of a PC.

FIG. 4 is a block diagram showing, by way of example, the hardware configuration of a PC. Referring to FIG. 4, PC 200 includes: a CPU 201 which is responsible for overall control of PC 200; a ROM 202 which stores a program executed by CPU 201 and the like; a RAM 203 which is used as a work area for CPU 201; a network I/F 204 for connecting PC 200 to network 2; a HDD 205 as a mass storage; a display portion 206; and an operation portion 207 for accepting input of operation by a user.

Figure 5:
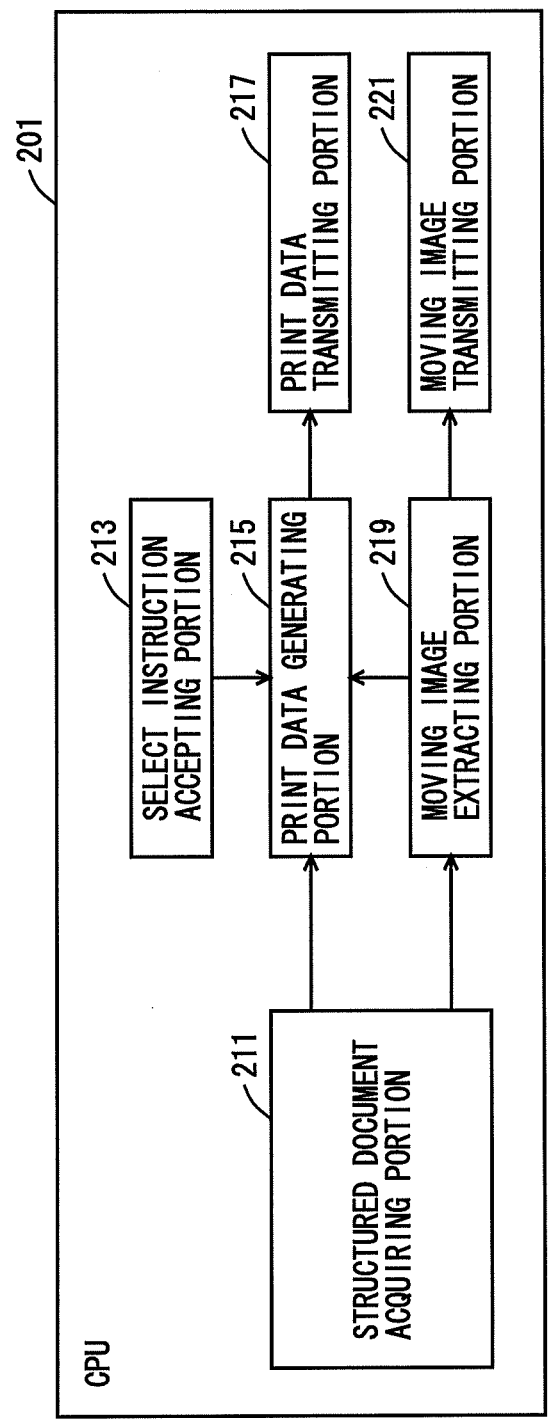
FIG. 5 is a functional block diagram showing, by way of example, the functions of a CPU included in the PC.

FIG. 5 is a functional block diagram showing, by way of example, the functions of the CPU included in the PC. Referring to FIG. 5, CPU 201 included in PC 200 includes: a structured document acquiring portion 211 which acquires a structured document; a print data generating portion 215 which generates print data on the basis of a structured document; a print data transmitting portion 217 which transmits print data to MFP 100, 101, or 102; a moving image extracting portion 219 which extracts a moving image from a structured document; a moving image transmitting portion 221 which transmits a moving image to MFP 100, 101, or 102; and a select instruction accepting portion 213 which accepts an instruction to select one frame from within a moving image.

Structured document acquiring portion 211 specifies a structured document in accordance with a print operation input into operation portion 207 by a user, to acquire the specified structured document. For example, when an operation for printing a structured document stored in HDD 205 is accepted, structured document acquiring portion 211 reads the structured document stored in HDD 205 to acquire it. When an operation for printing a Web page downloaded from a Web server is accepted while a browsing program is being executed, structured document acquiring portion 211 acquires a Web page which has been downloaded and temporarily stored in RAM 203. Structured document acquiring portion 211 outputs the acquired structured document to print data generating portion 215 and moving image extracting portion 219.

When the structured document received from structured document acquiring portion 211 includes a moving image, moving image extracting portion 219 extracts the moving image from the structured document. When the structured document received from structured document acquiring portion 211 links with a moving image, moving image extracting portion 219 acquires the linked moving image. When the structured document links with a moving image, the structured document includes positional information, for example a file name or a uniform resource locator (URL), showing a position on a network at which the moving image is stored. Moving image extracting portion 219 acquires the moving image that is stored in the positional information included in the structured document. For example, when the positional information indicates a URL of a moving image stored in a server connected to the Internet, moving image extracting portion 219 downloads, from the server via network I/F 204, the moving image specified by the URL. Moving image extracting portion 219 attaches, to the moving image extracted from the structured document or to the moving image acquired on the basis of the positional information included in the structured document, moving image identification information for identifying the moving image. It then outputs a combination of the moving image and the moving image identification information to moving image transmitting portion 221. The moving image identification information may be a file name or any other information, as long as it can be identified within PC 200. Furthermore, moving image extracting portion 219 outputs, to print data generating portion 215, a combination of the moving image identification information and positional information which shows a position where the moving image is displayed, in a display image on which the structured document is displayed. The positional information is information for specifying a rectangular area included in the display image displaying the structured document. For example, it may be coordinates of two diagonal corners of the rectangle.

When the structured document includes a plurality of moving images, moving image extracting portion 219 extracts the plurality of moving images, and outputs, for each of the plurality of moving images, the combination of the moving image and the moving image identification information to moving image transmitting portion 221, and the combination of the moving image identification information and the positional information to print data generating portion 215.

Print data generating portion 215 generates print data in accordance with the structured document received from structured document acquiring portion 211, and outputs the generated print data to print data transmitting portion 217. Specifically, print data generating portion 215 receives the combination of the moving image identification information and the positional information from moving image extracting portion 219. Print data generating portion 215 firstly generates a still image on which a frame selected from among a plurality of frames included in the moving image identified by the moving image identification information included in the combination received from moving image extracting portion 219 is arranged at the position, in a display image displaying the structured document, that is specified by the positional information included in the combination received from moving image extracting portion 219. That is, the positional information included in the combination of the moving image identification information and the positional information received from moving image extracting portion 219 indicates the position at which the frame is arranged in the still image.

When receiving a plurality of combinations of the moving image identification information and the positional information from moving image extracting portion 219, print data generating portion 215 generates a still image on which, for each of the received combinations, a frame selected from among a plurality of frames included in the moving image identified by the moving image identification information is arranged at the position, in the display image displaying the structured document, that is specified by the positional information.

Print data generating portion 215 selects one of a plurality of frames included in the moving image in the following manner. When the structured document includes frame identification information for identifying a start frame at which the playback of the moving image is to be started, print data generating portion 215 selects the frame identified by the frame identification information. The frame identification information is information for identifying each of the plurality of frames included in the moving image. When frame identification information for the frame selected by a user is received from select instruction accepting portion 213 which will be described later, print data generating portion 215 selects the frame identified by the frame identification information received from select instruction accepting portion 213, regardless of whether the structured document includes frame identification information. When no frame identification information is included in the structured document and no frame identification information is received from select instruction accepting portion 213, then print data generating portion 215 selects a first frame from among the plurality of frames included in the moving image. In the case where a plurality of combinations of the moving image identification information and the positional information are input from moving image extracting portion 219, print data generating portion 215 selects a frame for each of the moving images in correspondence with the combinations.

Furthermore, print data generating portion 215 generates print data that includes the still image which has been generated and the combination of the moving image identification information and the positional information which has been received from moving image extracting portion 219. In the case where a plurality of such combinations are input from moving image extracting portion 219, print data generating portion 215 generates the print data including the positional information and the moving image identification information included in each of the combinations. Here, the print data is written in a language, such as page description language (PDL), for creating a printable bitmap image that can be interpreted by any of MFPs 100, 101, and 102.

In the case where the frame identification information is included in the structured document, or in the case where the frame identification information is input from select instruction accepting portion 213, print data generating portion 215 generates the print data that further includes the frame identification information. The frame information is received from moving image extracting portion 219 in association with the combination, and thus, when a plurality of such combinations are input from moving image extracting portion 219, print data generating portion 215 generates the print data in which the positional information and the moving image identification information included in each of the plurality of combinations are associated with the frame information corresponding to that combination.

When a user inputs into operation portion 207 an operation for selecting one of a plurality of frames included in the moving image, select instruction accepting portion 213 outputs to print data generating portion 215 the frame identification information for the frame selected by the user from among the plurality of frames included in the moving image. For example, in the state where the moving image is displayed on display portion 206, when the user performs an operation for stopping the playback, the operation is accepted as an operation for selecting the frame. Select instruction accepting portion 213 outputs to print data generating portion 215 the frame identification information for the frame that is being displayed at the time when the operation for stopping the playback is accepted.

When a user inputs into operation portion 207 an operation for designating any of MFPs 100, 101, and 102, print data transmitting portion 217 outputs the print data to the specified one of MFPs 100, 101, and 102. The user's operations for designating one of MFPs 100, 101, and 102 and designating a structured document are part of the operation for causing printing of a structured document.

Moving image transmitting portion 221 transmits the moving image received from moving image extracting portion 219, to the one of MFPs 100, 101, and 102 to which the print data has been transmitted. The moving image is transmitted along with the moving image identification information attached thereto, which is a file name here. Therefore, the one of MFPs 100, 101, and 102 that receives the print data and the moving image can identify the received moving image on the basis of the moving image identification information included in the received print data. Particularly, in the case where the structured document includes a plurality of moving images, the plurality of moving images are transmitted to the one of MFPs 100, 101, and 102 to which the print data has been transmitted. The one of MFPs 100, 101, and 102 that receives the print data can identify the plurality of moving images on the basis of the plurality of pieces of moving image identification information included in the print data.

Figure 6:
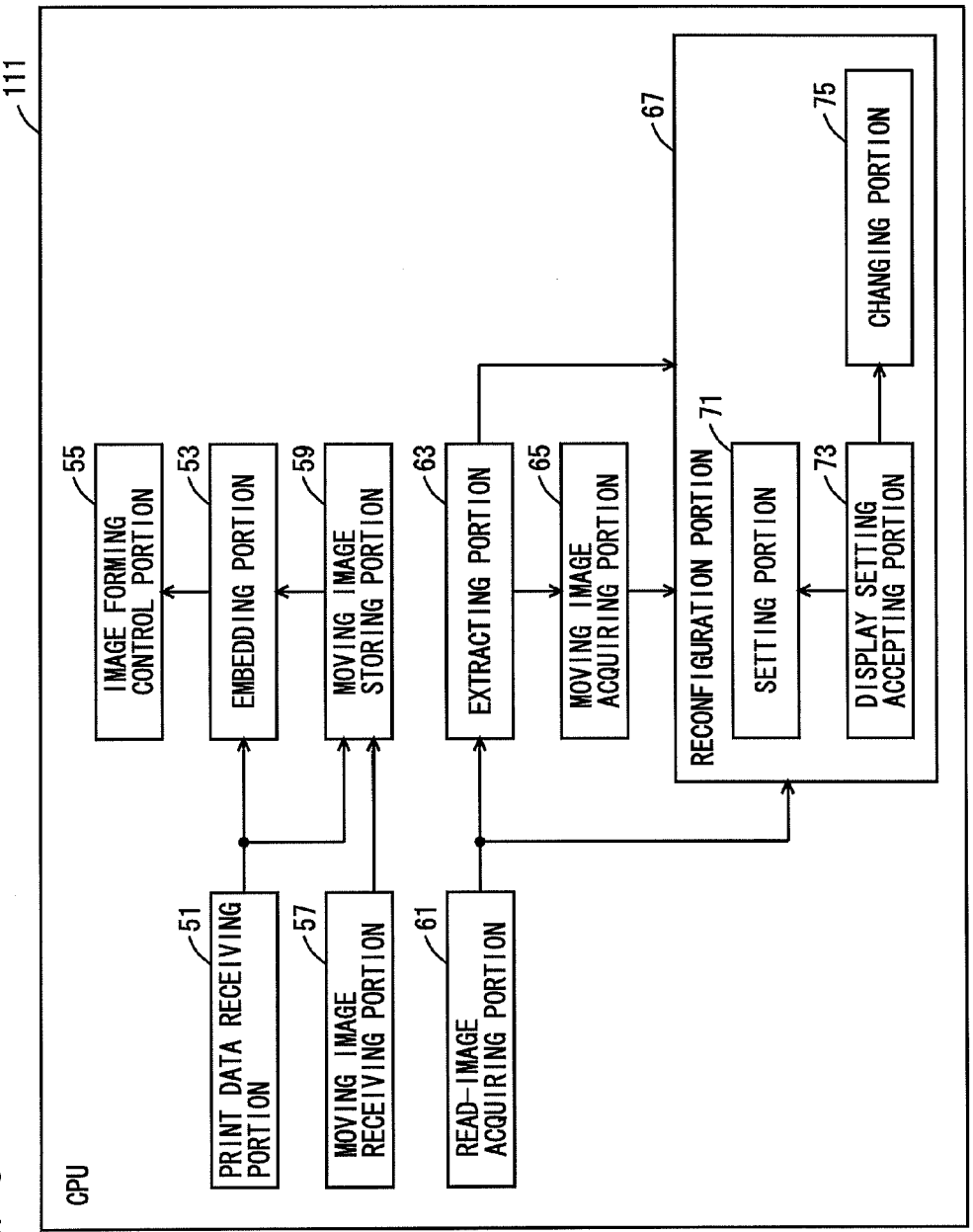
FIG. 6 is a functional block diagram showing, by way of example, the functions of a CPU included in the MFP.

FIG. 6 is a functional block diagram showing, by way of example, the functions of the CPU included in the MFP. Referring to FIG. 6, CPU 111 included in MFP 100 includes: a print data receiving portion 51 which receives print data from PC 200; a moving image receiving portion 57 which receives a moving image from PC 200; a moving image storing portion 59 which stores a moving image that has been received; an embedding portion 53 which embeds moving image identification information and positional information in a still image included in print data; an image forming control portion 55 which forms a still image on a sheet of paper; a read-image acquiring portion 61 which acquires a still image output from original reading portion 130 that read an original; an extracting portion 63 which extracts, from a still image, information embedded therein; a moving image acquiring portion 65 which acquires a moving image on the basis of information that has been extracted; and a reconfiguration portion 67 which configures a structured document from a still image and a moving image.

As noted above, when PC 200 receives an instruction to print in MFP 100 a structured document including a moving image, PC 200 transmits print data and the moving image to MFP 100. When communication I/F portion 112 receives the print data from PC 200, print data receiving portion 51 acquires the print data and outputs the acquired print data to embedding portion 53. As described above, the print data includes: the still image on which a frame selected from among a plurality of frames included in the moving image is arranged at a position, in a display image displaying the structured document, where the moving image is displayed; the positional information showing the position at which the frame is arranged in the still image; and the moving image identification information. The print data may also include the frame identification information for identifying the frame which is arranged in the still image.

When communication I/F portion 112 receives the moving image and the moving image identification information from PC 200, moving image receiving portion 57 acquires the moving image and the moving image identification information, and outputs the acquired moving image and moving image identification information to moving image storing portion 59. It is noted that moving image receiving portion 57 may download the moving image from PC 200 on the basis of the moving image identification information included in the print data.

Moving image storing portion 59 stores the moving image received from moving image receiving portion 57 in HDD 116. Moving image storing portion 59 stores the moving image in association with the moving image identification information that is received along with the moving image. At this point, the moving image identification information is information which can be distinguished from any other data in MFP 100. Moving image storing portion 59 outputs the moving image identification information for identifying the stored moving image (which may be a file name, for example) to embedding portion 53.

The moving image identification information which is output from moving image storing portion 59 to embedding portion 53 is the same as the moving image identification information included in the print data. Therefore, a plurality of pieces of moving image identification information may be included in the print data and, in such a case, a plurality of moving images as well as a plurality of pieces of moving image identification information are received from PC 200. The plurality of moving images received are each specified as one of the plurality of pieces of moving image identification information included in the print data, in accordance with the moving image identification information received together with the moving images. As such, each of the plurality of moving images stored in HDD 116 is identified by the moving image identification information included in the print data.

While the moving image is stored in HDD 116 of MFP 100 in the present embodiment, the moving image may be stored in another MFP 101 or 102, or may be stored in a file server connected to network 2. In this case, the moving image identification information includes device identification information for identifying the device in which the same is stored, which may be address information in network 2.

Embedding portion 53 extracts the still image, the moving image identification information, and the positional information from the print data received from print data receiving portion 51. When the print data includes frame identification information, embedding portion 53 further extracts the frame identification information. Embedding portion 53 then embeds the positional information and the moving image identification information as watermark information in the still image. When the print data includes two or more combinations of the moving image identification information and the positional information, embedding portion 53 embeds the moving image identification information and the positional information in association with each other.

When the frame identification information is extracted from the print data, embedding portion 53 also embeds the frame identification information in the still image. The information does not necessarily have to be embedded as a watermark image in the still image. A digital watermark technique may be used, or a barcode may be added. Embedding portion 53 outputs the still image embedded with the positional information, the moving image identification information, and the frame identification information if the same is included in the print data, to image forming control portion 55. Image forming control portion 55 controls image forming portion 140 to form on a sheet of paper the still image received from embedding portion 53.

Read-image acquiring portion 61 acquires a still image output from original reading portion 130 which read an original, and outputs the acquired still image to extracting portion 63 and reconfiguration portion 67. In the case where original reading portion 130 reads an original on which the above-described still image has been formed by image forming portion 140, the still image acquired from original reading portion 130 has at least positional information and moving image identification information embedded therein. The still image may also have frame identification information embedded therein.

Extracting portion 63 determines whether the positional information and the moving image identification information are embedded in the received still image, and if so, it extracts them from the still image. Extracting portion 63 outputs the extracted moving image identification information to moving image acquiring portion 65, and outputs the extracted combination of moving image identification information and positional information to reconfiguration portion 67. In the case where the frame identification information is also embedded in the still image, extracting portion 63 extracts it from the still image, and outputs the extracted frame identification information to reconfiguration portion 67. In the case where a plurality of pieces of moving image identification information are extracted from the still image, extracting portion 63 outputs, for each of the plurality of pieces of moving image identification information, a combination of the moving image identification information, the positional information associated with that moving image identification information, and the frame identification information if the same is extracted, to reconfiguration portion 67.

Moving image acquiring portion 65 reads from HDD 116 the moving image identified by the moving image identification information received from extracting portion 63, and outputs the combination of the read moving image and the moving image identification information to reconfiguration portion 67.

Reconfiguration portion 67 generates a structured document on the basis of the still image received from read-image acquiring portion 61, the combination of the moving image and the moving image identification information received from moving image acquiring portion 65, and the combination of the moving image identification information, the positional information, and the frame identification information received from extracting portion 63. Specifically, reconfiguration portion 67 generates the structured document which is set such that the moving image identified by the moving image identification information is displayed at the position, in the still image, that is specified by the positional information. The structured document including the moving image at the position specified by the positional information may be generated, or the structured document which links with the moving image may be generated. In the case where the frame identification information is input from extracting portion 63, reconfiguration portion 67 further uses the frame identification information to generate the structured document. Specifically, reconfiguration portion 67 sets the structured document such that, when the generated structured document is displayed, the playback of the moving image is started at the frame identified by the frame identification information.

Reconfiguration portion 67 includes a display setting accepting portion 73 which accepts display setting for displaying a structured document, a changing portion 75 which changes a moving image in accordance with the display setting, and a setting portion 71 which sets a structured document in accordance with the display setting. Display setting accepting portion 73 displays a display setting screen on display portion 160A, and accepts the display setting which is input to operation portion 160B by a user. The display setting screen includes an area for setting a display size of the moving image, an area for setting image quality of the moving image, and an area for setting a start frame at which the playback of the moving image is to be started. When the display size of the moving image is set, display setting accepting portion 73 outputs to changing portion 75 an instruction to change the resolution of the moving image to that of the display size. When the image quality of the moving image is set, display setting accepting portion 73 outputs to changing portion 75 an instruction to change the image quality of the moving image to that image quality. For example, the image quality includes the number of colors in a moving image and shades of gray. When receiving a change instruction from display setting accepting portion 73, changing portion 75 changes the resolution or the image quality of the moving image received from moving image acquiring portion 65, in accordance with the change instruction.

When the start frame is set, display setting accepting portion 73 outputs the frame identification information for the start frame to setting portion 71. Setting portion 71 sets the start frame at which the playback of the moving image is started. In the case where the frame identification information is input from extracting portion 63, setting portion 71 sets the frame identified by the frame identification information as the start frame. In the case where the frame identification information is input from display setting accepting portion 73, setting portion 71 sets the frame identified by the frame identification information received from display setting accepting portion 73 as the start frame, regardless of whether the frame identification information is received from extracting portion 63. Furthermore, in the case where the frame identification information is not input from display setting accepting portion 73 or extracting portion 63, setting portion 71 sets a first frame of the moving image as the start frame.

Figure 7:
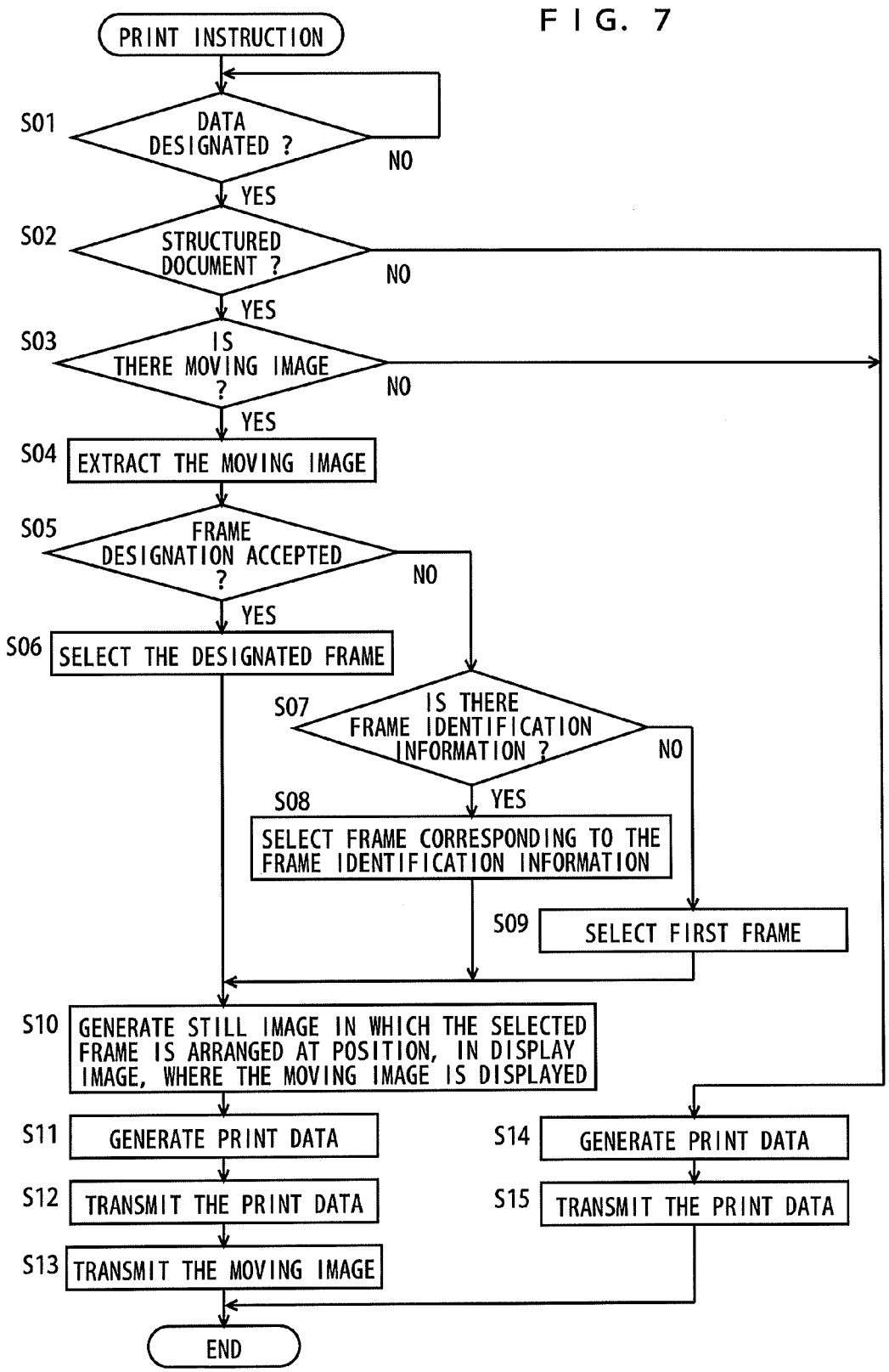
FIG. 7 is a flowchart illustrating an example of the flow of a print instruction process.

FIG. 7 is a flowchart illustrating an example of the flow of a print instruction process. The print instruction process is carried out by CPU 201 included in PC 200 as CPU 201 executes a driver program. The driver program is part of an image processing program. Referring to FIG. 7, CPU 201 determines whether a designation of data to be printed has been accepted (step S01). CPU 201 is in a standby mode until the designation of data to be printed is accepted (NO in step S01), and once the designation of data to be printed is accepted, the process proceeds to step S02. That is, the print instruction process is a process executed on the condition that the data to be printed is designated. When an operation for instructing printing is input in the state where a browsing program is being executed and a Web page is being displayed, the Web page which is being displayed is designated as the data to be printed. When an operation for instructing printing is input in the state where the user is using an application program to display data stored in HDD 205, the data which is being displayed is designated as the data to be printed. When an operation for instructing printing is input in the state where data stored in HDD 205 is designated, the designated data is designated as the data to be printed.

In step S02, it is determined whether the data to be printed is a structured document. If it is the structured document, the process proceeds to step S03; otherwise, the process proceeds to step S14. In step S03, it is determined whether the data to be printed includes a moving image. If the data is a structured document including a moving image or a structured document which links with a moving image, it is determined that the data includes a moving image. If the data to be printed includes a moving image, the process proceeds to step S04; otherwise, the process proceeds to step S14.

In step S04, the moving image is extracted. If the structured document includes a moving image, the moving image is extracted from the structured document. If the structured document links with a moving image, the linked moving image is acquired. At this stage, moving image identification information for identifying the extracted moving image is attached to that moving image.

In step S05, it is determined whether an operation for designating a frame at which playback of the extracted moving image is to be started has been accepted. For example, in the state where the moving image is displayed on display portion 206, if the user inputs an operation for stopping the playback, the operation is accepted as an operation for designating the frame that is being displayed at that time. If the operation for designating the frame is accepted, the process proceeds to step S06; otherwise, the process proceeds to step S07. In step S06, the designated frame is selected as a start frame (step S06), and the process proceeds to step S10. A user who instructs printing can change a frame at which a moving image is to be started. That is, the user who instructs printing can change the structured document that is reconfigured.

In step S07, it is determined whether the structured document includes frame identification information. Specifically, it is determined whether the structured document includes the frame identification information for the start frame at which the playback of the moving image is to be started. If such frame identification information is included, the process proceeds to step S08; otherwise, the process proceeds to step S09. In step S08, the frame that is identified by the frame identification information included in the structured document is selected, and the process proceeds to step S10. In the case where a start frame is defined for the reconfigured, structured document, the start frame may be incorporated, as it is, into a still image that will be formed next. In step S09, a first frame of the moving image is selected, and the process proceeds to step S10.

In step S10, a still image is generated in which the frame selected in step S06, S08, or S09 is arranged at the position, in the display image, where a moving image is displayed.

Print data is then generated (step S11). Here, the print data generated is written in printer job language (PJL) or page description language (PDL), and includes a still image, positional information showing the position, in the still image, where a frame is arranged, and moving image identification information for identifying the moving image extracted in step S04. The moving image identification information is included in the print data because, in the case where a structured document includes a plurality of moving images, the positions in the still image corresponding respectively to the plurality of moving images have to be specified. This means that, in the case where a structured document includes only one moving image, the moving image identification information does not necessarily have to be included in the print data.

In step S12, the generated print data is transmitted to the one of MFPs 100, 101, and 102 that has been designated by a user in operation portion 160B, and the process is finished. Here, it is assumed that MFP 100 is designated. A plurality of pieces of device identification information for identifying MFPs 100, 101, and 102, respectively, are displayed on display portion 206, and a designation of any of the pieces of the device identification information is accepted. In step S13, the moving image extracted in step S04 is transmitted to MFP 100 to which the print data has been transmitted. As a result, the print data and the moving image are transmitted to MFP 100.

On the other hand, in step S14, print data for printing the data designated in step S01 is generated. In the following step S15, the print data is transmitted to one of MFPs 100, 101, and 102 that has bee designated by a user in operation portion 160B, and the process is finished.

Figure 8:
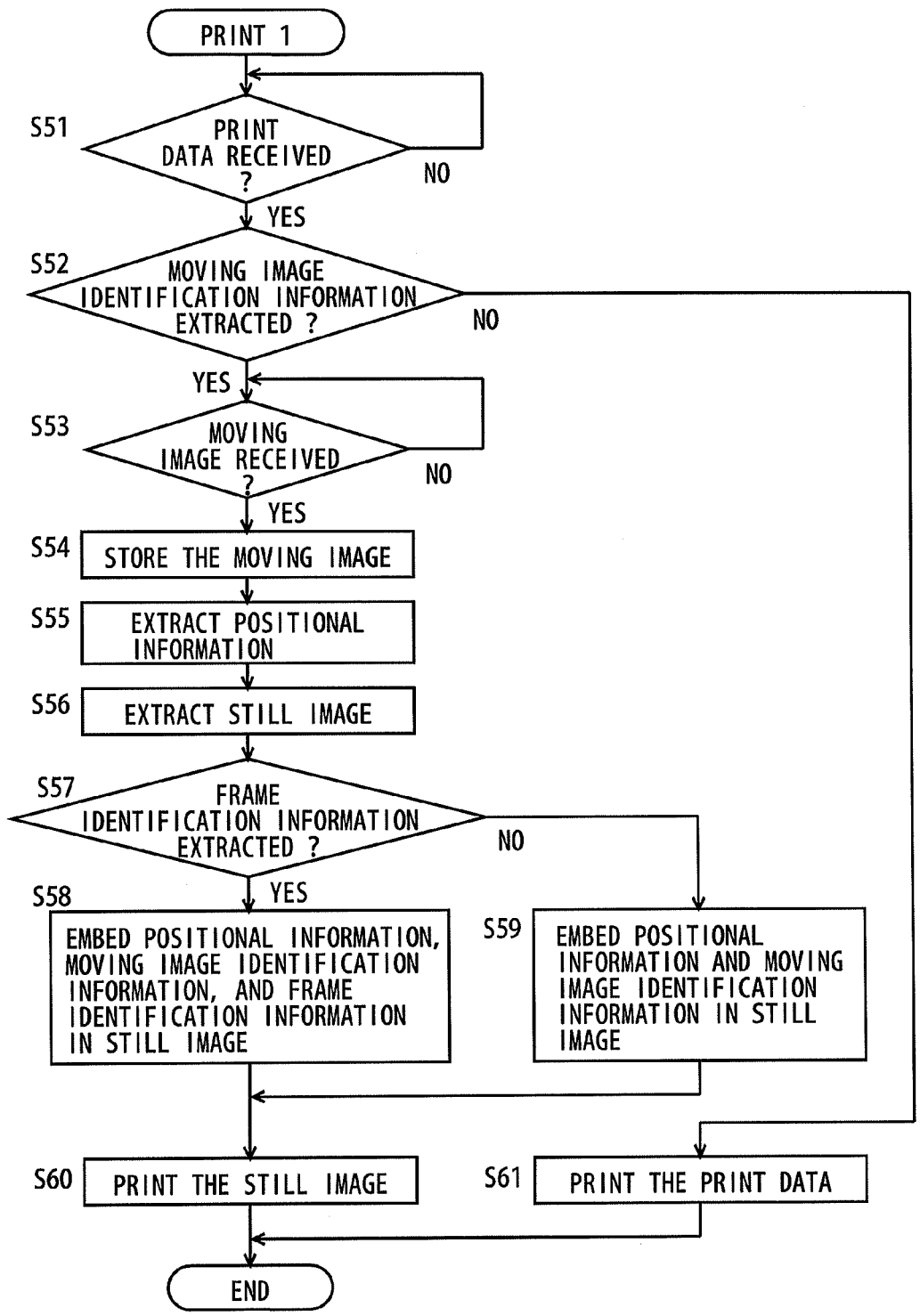
FIG. 8 is a flowchart illustrating an example of the flow of a print process.

FIG. 8 is a flowchart illustrating an example of the flow of a print process. The print process is carried out by CPU 111 included in each of MFPs 100, 101, and 102 as CPU 111 executes a print program. The print program is part of the image processing program. Here, it is assumed that MFP 100 executes the print process. Referring to FIG. 8, CPU 111 included in MFP 100 is in a standby mode until it receives print data from PC 200 (NO in step S51), and once it receives the print data (YES in step S51), the process proceeds to step S52. That is, the print process is a process executed on the condition that MFP 100 receives print data.

In step S52, it is determined whether moving image identification information has been extracted from the received print data. If the moving image identification information has been extracted, the process proceeds to step S53; otherwise, the process proceeds to step S61.

In step S53, CPU 111 waits until it receives a moving image from PC 200 from which the print data has been received (NO in step S53), and once it receives the moving image (YES in step S53), the process proceeds to step S54. It is noted that in the case where a plurality of pieces of moving image identification information have been extracted in step S52, CPU 111 remains in the standby mode until it receives all of the plurality of moving images corresponding respectively to the plurality of pieces of moving image identification information, and once it receives all of the plurality of moving images, the process proceeds to step S54. In step S54, the received moving image is stored in HDD 116. The moving image is stored in HDD 116 in the state where moving image identification information is attached thereto. By doing so, when two or more moving images are received from PC 200, the plurality of moving images stored in HDD 116 can be distinguished from each other.

Then, from the print data received in step S51, positional information is extracted (step S55) and a still image is extracted (step S56). Furthermore, it is determined whether frame identification information has been extracted from the print data received in step S51 (step S57). If so, the process proceeds to step S58; otherwise, the process proceeds to step S59.

In step S58, the positional information extracted in step S55, the moving image identification information for the moving image stored in step S54, and the frame identification information extracted in step S57 are embedded as a watermark image in the still image extracted in step S56. The process then proceeds to step S60. In the case where a plurality of pieces of moving image identification information are extracted in step S52, the positional information, the moving image identification information, and the frame identification information are embedded in association with each other. On the other hand, in step S59, the positional information extracted in step S55 and the moving image identification information for the moving image stored in step S54 are embedded as a watermark image in the still image extracted in step S56, and the process proceeds to step S60. At this time, the positional information and the moving image identification information are embedded in association with each other.

In step S60, the still image is printed. Specifically, the still image is output to image forming portion 140 to cause it to form the still image on a sheet of paper. As a result, a still image overlaid with a watermark image that includes at least the positional information and second moving image identification information is formed on a sheet of paper.

On the other hand, in step S61, the print data received in step S51 is printed, and the process is finished.

Figure 9:
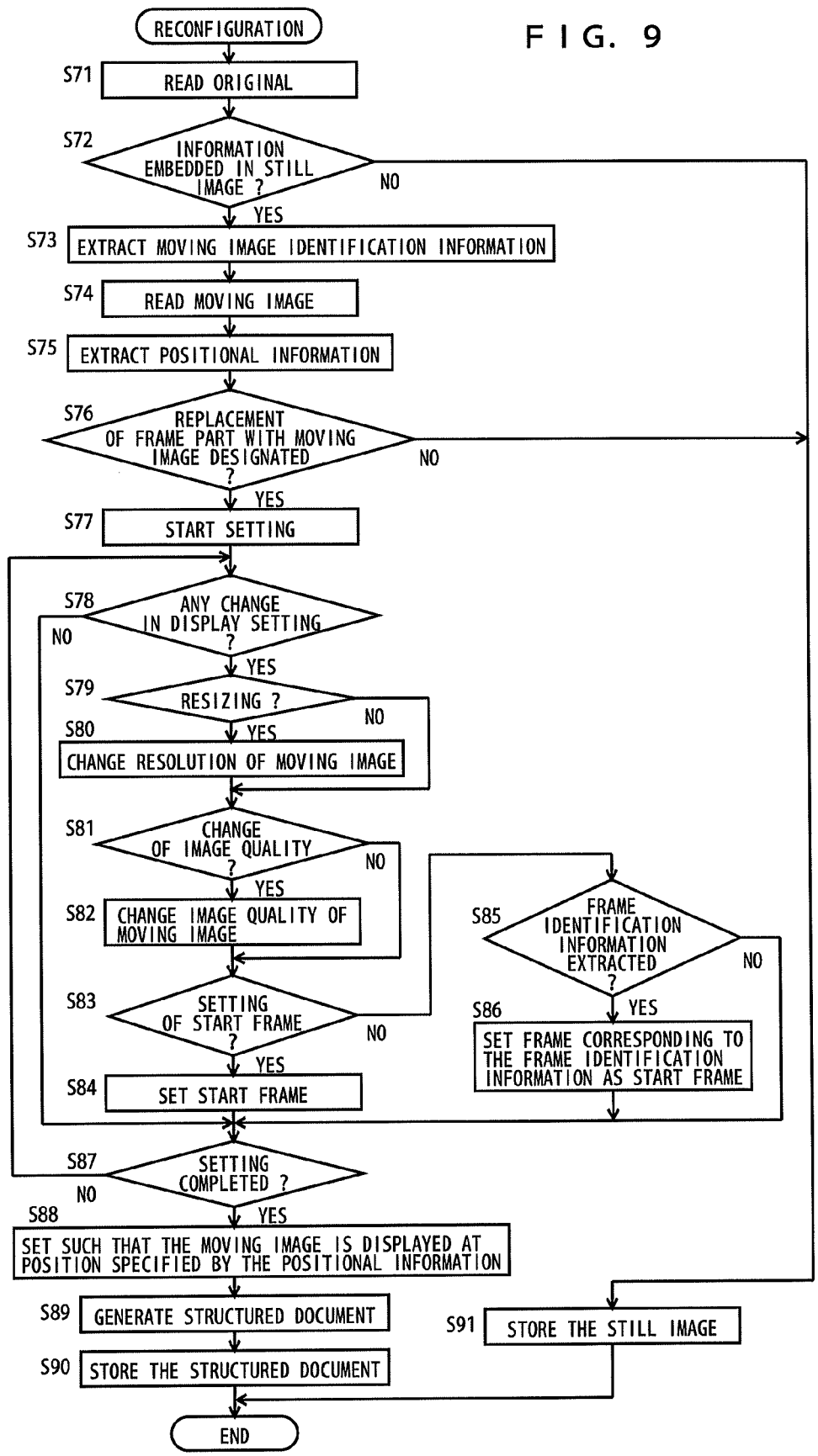
FIG. 9 is a flowchart illustrating an example of the flow of a reconfiguration process.

FIG. 9 is a flowchart illustrating an example of the flow of a reconfiguration process. The reconfiguration process is carried out by CPU 111 included in each of MFPs 100, 101, and 102 as CPU 111 executes a reconfiguration program. The reconfiguration program is part of the image processing program. Here, it is assumed that MFP 100 executes the reconfiguration process.

Referring to FIG. 9, CPU 111 included in MFP 100 reads an original (step S71). When a user sets an original in automatic document feeder 120 and presses the start button down, original reading portion 130 reads an image which is formed on the original. Here, the original read by original reading portion 130 is a sheet of paper on which a still image has been formed by the print process described in conjunction with FIG. 8. Original reading portion 130, which has read the original, outputs electronic data of the still image formed on the original, so that the still image is acquired in the form of electronic data.

In the following step S72, it is determined whether the still image acquired by reading the original has information embedded therein. If information is embedded in the still image, the process proceeds to step S73; otherwise, the process proceeds to step S91. In step S91, the still image is stored in HDD 116, and the process is finished.

In step S73, moving image identification information embedded in the still image is extracted. Then, the moving image identified by the moving image identification information is read from HDD 116 (step S74). In the print process shown in FIG. 8, the moving image having the moving image identification information attached thereto has been stored in HDD 116 in step S54. Therefore, the moving image identified by the moving image identification information which was extracted from the still image is stored in HDD 116. It is noted that, in the case where the print process was executed in another MFP 101 or 102, for example when it was executed in MFP 101, the moving image has been stored in MFP 101 in which the print process was executed. In this case, the moving image identification information may be configured to include the device identification information for identifying the device, and the moving image may be acquired from the device, i.e. MFP 101, in which the moving image is stored. It is noted that the moving image stored in MFP 101 is stored in a freely accessible position in a HDD included in MFP 101, so that the moving image can be accessed from MFP 100.

In the following step S75, positional information embedded in the still image is extracted. Then, in step S76, it is determined whether an instruction to replace a frame part in the still image with the moving image has been accepted. The determination is made according to whether a user has input into operation portion 160B the instruction to replace the frame part with the moving image. If the instruction to replace the frame part with the moving image is accepted, the process proceeds to step S77; otherwise, the process proceeds to step S91 where the still image is stored in HDD 116, and the process is finished.

In step S77, setting for reconfiguring the structured document is started. In the state where the display setting screen is displayed on display portion 160A, if display setting input to operation portion 160B by a user is accepted, the process proceeds to step S79; otherwise, the process proceeds to step S87. In step S79, it is determined whether the display setting that has been accepted is setting for resizing. If so, the process proceeds to step S80; otherwise, the process proceeds to step S81, with step S80 being skipped. In step S80, the resolution of the moving image read out in step S74 is changed into the resolution for display in the changed size, and the process proceeds to step S81.

In step S81, it is determined whether the display setting that has been accepted is setting for changing image quality. If so, the process proceeds to step S82; otherwise, the process proceeds to step S83, with step S82 being skipped. In step S82, the image quality of the moving image read out in step S74, or if the resolution has been changed in step S80, the image quality of the moving image of which resolution has been changed, is changed in accordance with the setting, and the process proceeds to step S83.

In step S83, it is determined whether the display setting that has been accepted is setting of a start frame. If so, the process proceeds to step S84; otherwise, the process proceeds to step S85. The setting of the start frame includes the frame identification information for specifying the start frame. For example, in the state where the moving image is displayed on display portion 160A, if the user inputs an instruction to stop the playback, the setting of the start frame is accepted. Then, the frame that was being displayed at the time when the user input the instruction to stop the playback is set as the start frame, and the process proceeds to step S87. Specifically, it is set such that, when the structured document generated is displayed and the moving image is played back, the playback is started at the start frame. It is noted that, of a plurality of frames included in the moving image, any frame preceding the start frame may be deleted. The user who has issued the instruction to read the sheet of paper on which the still image is formed can determine the start frame of the moving image, whereby the intention of the user who has issued the instruction to read the sheet of paper having the still image formed thereon can be respected.

In step S85, it is determined whether frame identification information embedded in the still image has been extracted. If so, the process proceeds to step S86; otherwise, the process proceeds to step S87, with step S86 being skipped. In step S86, a frame corresponding to the frame identification information extracted from the still image is set as the start frame, and the process proceeds to step S87. The user who has issued the instruction to form the still image on the read sheet of paper can specify the start frame of the moving image, whereby the intention of the user who has issued the instruction to form the still image can be respected.

In step S87, it is determined whether the setting has been completed. When a user inputs an instruction to terminate the setting to operation portion 160B, it is determined that the setting has been completed. If the setting has been completed, the process proceeds to step S88; otherwise, the process returns to step S78.

In step S88, it is set such that the moving image is displayed at a position, in the still image, that is specified by the positional information extracted in step S75. In the case where the resolution has been changed in step S80, it is set such that the moving image is displayed in an arbitrary area in the area specified by the positional information. In the case where a plurality of pieces of moving image identification information have been extracted in step S73, it is set such that each of the plurality of moving images identified by the corresponding moving image identification information is displayed at a position that is specified by the corresponding positional information.

In step S89, a structured document is generated in accordance with the still image acquired in step S71 and the content set in step S88. In the following step S90, the generated structured document is stored in HDD 116, and the process is finished.

As described above, according to the image processing system of the present embodiment, PC 200 serving as the control apparatus acquires a structured document including a moving image, generates print data which includes: a still image in which one frame selected from among a plurality of frames included in the moving image is arranged at a position, in a display image on which the structured document is displayed, where the moving image is displayed; positional information showing the position at which the frame is arranged in the still image; and moving image identification information for identifying the moving image, and transmits the print data and the moving image to MFP 100 serving as the image processing apparatus. On the other hand, MFP 100 serving as the image processing apparatus, when forming an image, receives the print data and the moving image from PC 200, stores the moving image in association with the moving image identification information that is received together with the moving image, embeds, in the still image included in the print data, the moving image identification information for the stored moving image and the positional information included in the print data, and forms the still image on a sheet of paper. Furthermore, when reading an image, MFP 100 reads a still image formed on a sheet of paper, extracts moving image identification information and positional information from the read still image, acquires a moving image identified by the extracted moving image identification information, and generates a structured document in which the moving image is associated with the still image such that the moving image is displayed at a position specified by the positional information in the still image.

As described above, at the time of image reading, MFP 100 reads a still image formed on a sheet of paper, extracts moving image identification information and positional information from the still image, acquires a moving image identified by the extracted moving image identification information, and generates a structured document in which the acquired moving image is associated with the read still image in such a manner that the moving image is displayed at the extracted positional information in the still image. Therefore, even in the case where an image of a structured document including a moving image is formed, when the sheet of paper on which the image has been formed is read, the moving image that has been stored upon formation of the image can be specified. This enables formation of an image of a structured document without losing a moving image.

<Modification>

In the embodiment described above, PC 200 is configured to print a structured document using MFP 100. In contrast, according to a modification, MFP 100 stores a structured document in HDD 116, and MFP 100 is configured to print the structured document stored in HDD 116. In the following, the differences from the above-described image processing system will be described primarily.

Figure 10:
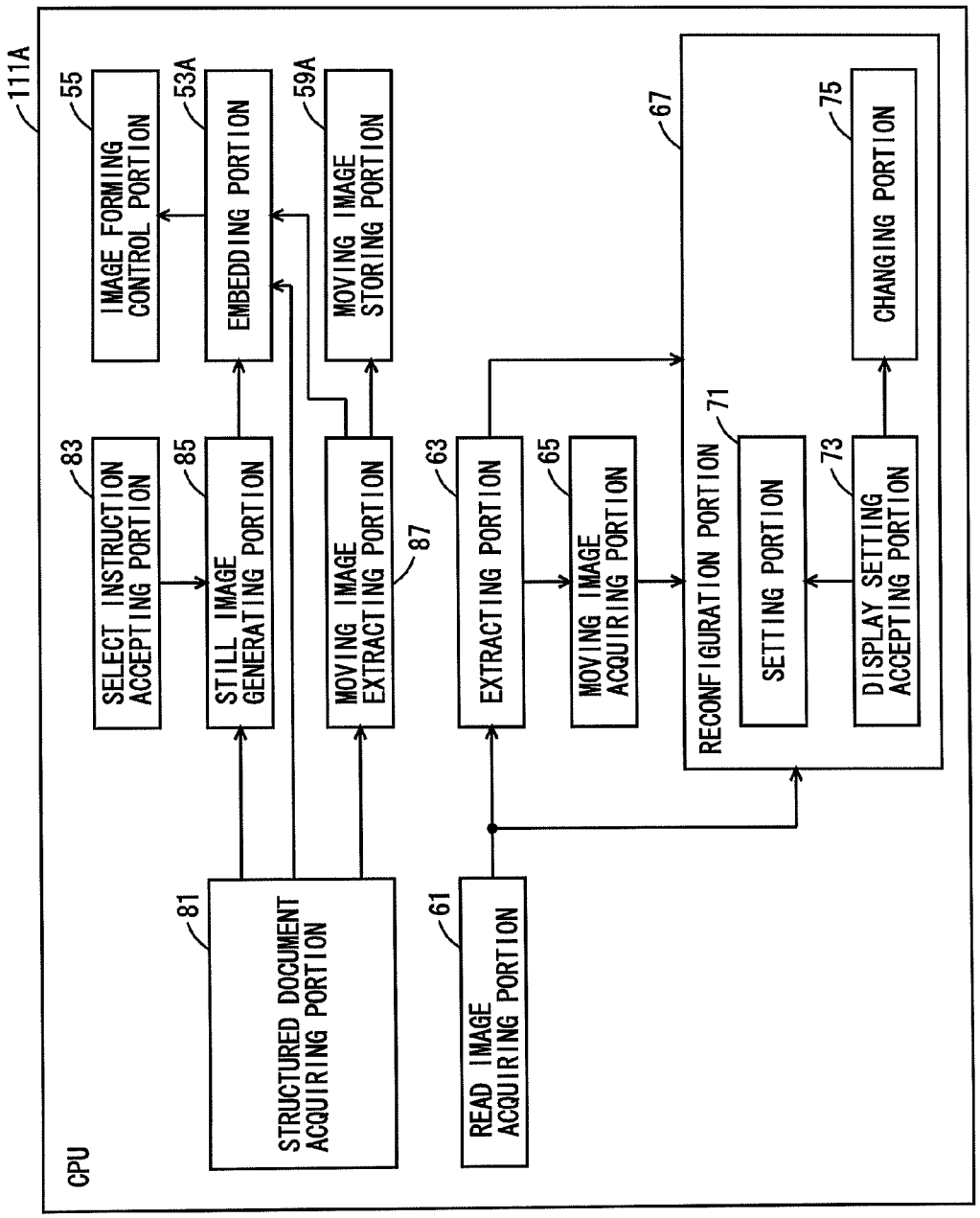
FIG. 10 is a functional block diagram showing, by way of example, the functions of the CPU 111 included in the MFP 100 according to a modification.

FIG. 10 is a functional block diagram showing, by way of example, the functions of the CPU 111 included in the MFP 100 according to the modification. Referring to FIG. 10, it differs from the functional block diagram shown in FIG. 6 in that print data receiving portion 51 and moving image receiving portion 57 have been deleted, a structured document acquiring portion 81, a select instruction accepting portion 83, a still image generating portion 85, and a moving image extracting portion 87 have been added, and moving image storing portion 59 and embedding portion 53 have been changed to a moving image storing portion 59A and an embedding portion 53A, respectively. The other functions are the same as those shown in FIG. 6, and thus, description thereof will not be repeated here.

Structured document acquiring portion 81 specifies a structured document in accordance with a print operation input into operation portion 160B by a user, to acquire the specified structured document. Specifically, in the case where an operation for printing a structured document stored in HDD 116 is accepted, structured document acquiring portion 81 reads the structured document stored in HDD 116 to acquire it. In the case where an operation for printing a Web page which has been downloaded from a Web server is accepted while a browsing program is being executed, structured document acquiring portion 81 acquires the Web page that has been downloaded and temporarily stored in RAM 114. Structured document acquiring portion 81 outputs the acquired structured document to still image generating portion 85 and moving image extracting portion 87.

In the case where the structured document input from structured document acquiring portion 81 includes a moving image, moving image extracting portion 87 extracts the moving image from the structured document. In the case where the structured document input from structured document acquiring portion 81 links with a moving image, moving image extracting portion 87 acquires the linked moving image. When the structured document links with a moving image, the structured document includes information, such as a URL, indicating the position where the moving image is stored. Moving image extracting portion 87 acquires the moving image stored in the position-indicating information included in the structured document. For example, when the positional information indicates a URL of a moving image stored in HDD 205 in PC 200, moving image extracting portion 87 downloads from PC 200 the moving image specified by the URL. Moving image extracting portion 87 attaches, to the moving image extracted from the structured document or to the moving image acquired on the basis of the position-indicating information included in the structured document, moving image identification information (a file name, for example) for identifying that moving image. Moving image extracting portion 87 then outputs a combination of the moving image and the moving image identification information to moving image storing portion 59A. It also outputs, to embedding portion 53A, a combination of the moving image identification information and the positional information indicating the position, in a display image displaying the structured document, where the moving image is displayed. The moving image identification information is information distinguishable from other data in MFP 100.

Moving image storing portion 59A stores the moving image received from moving image extracting portion 87 in HDD 116, in association with the moving image identification information that is received together with the moving image.

While a moving image is stored in HDD 116 in MFP 100 here, it may be stored in another MFP 101 or 102, or it may be stored in a file server connected to network 2. In this case, the moving image identification information includes device identification information for identifying the device in which the same is stored, which may be address information in network 2.

Still image generating portion 85 generates a still image in accordance with the structured document received from structured document acquiring portion 81, and outputs the generated still image to embedding portion 53A. Specifically, still image generating portion 85 firstly generates a still image on which one frame selected from among a plurality of frames included in a moving image is arranged at a position where the moving image is displayed, in a display image on which the structured document is displayed. In the case where the structured document includes frame identification information for specifying a start frame at which playback of the moving image is to be started, still image generating portion 85 selects a frame identified by the frame identification information. In the case where frame identification information for a frame that is selected by a user is input from select instruction accepting portion 83 which will be described later, still image generating portion 85 selects a frame identified by the frame identification information received from select instruction accepting portion 83, regardless of whether the structured document includes frame identification information. When no frame identification information is included in the structured document and no frame identification information is received from select instruction accepting portion 83, then still image generating portion 85 selects a first frame from among the plurality of frames included in the moving image.

When a user inputs into operation portion 160B an operation for selecting one of a plurality of frames included in the moving image, select instruction accepting portion 83 outputs to still image generating portion 85 the frame identification information for the frame selected by the user from among the plurality of frames included in the moving image. For example, in the state where the moving image is displayed on display portion 160A, when the user performs an operation for stopping the playback, the operation is accepted as an operation for selecting the frame. Select instruction accepting portion 83 outputs to still image generating portion 85 the frame identification information for the frame that is being displayed at the time when the operation for stopping the playback is accepted.

Embedding portion 53A receives the structured document from structured document acquiring portion 81, the still image from still image generating portion 85, and the combination of the moving image identification information and the positional information from moving image extracting portion 87. In the case where the structured document includes frame identification information for identifying a start frame, embedding portion 53A extracts the frame identification information. Embedding portion 53A then embeds the combination of the positional information and the moving image identification information received from moving image extracting portion 87 as watermark information in the still image received from still image generating portion 85. When two or more combinations of the moving image identification information and the positional information are received from moving image extracting portion 87, embedding portion 53A embeds the plurality of combinations. In the case where the frame identification information is extracted from the structured document, embedding portion 53A further embeds the frame identification information in the still image. Embedding portion 53A outputs to image forming control portion 55 the still image embedded with the combination of the moving image identification information and the positional information, and the frame identification information if the same is extracted from the structured document.

Figure 11:
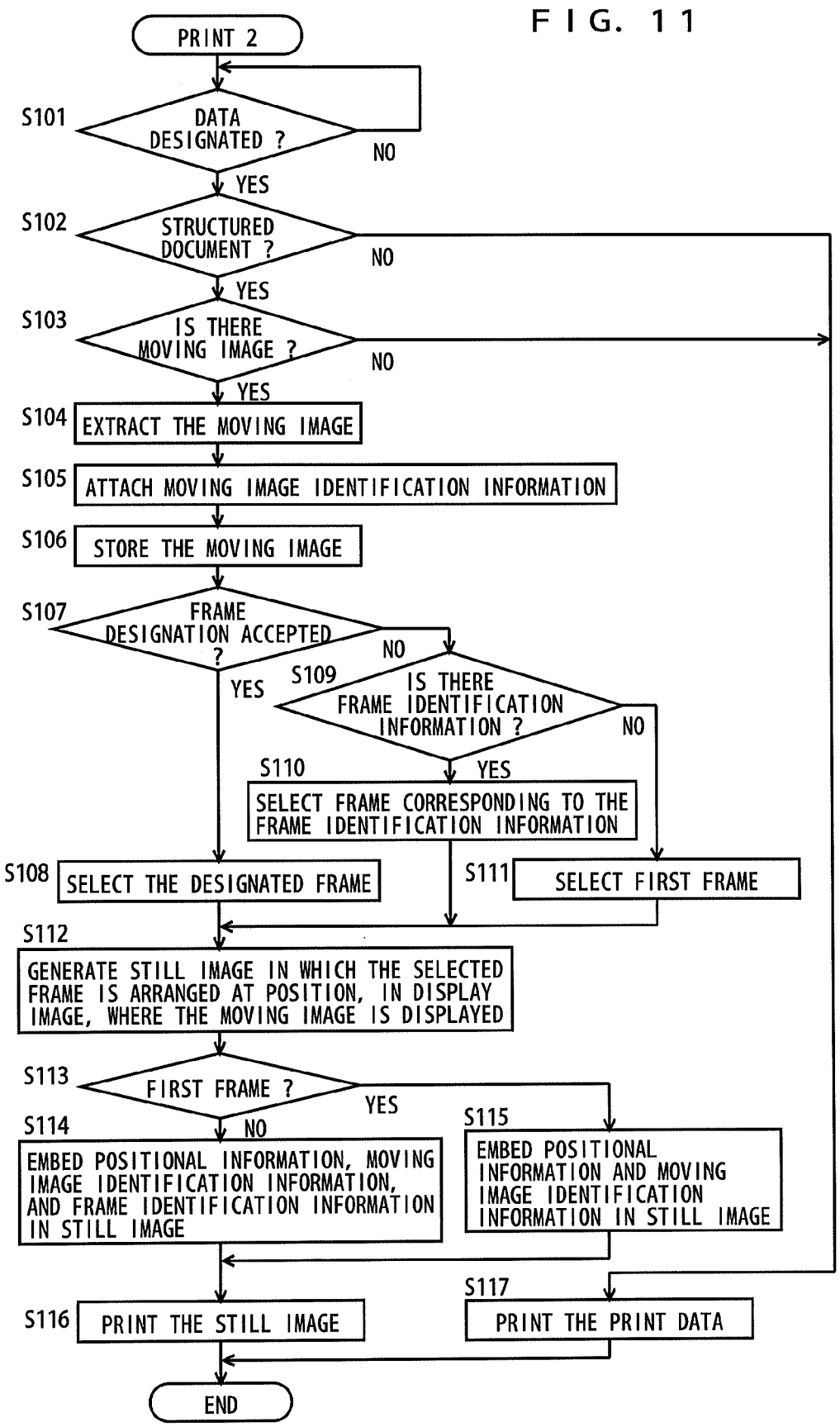
FIG. 11 is a flowchart illustrating an example of the flow of the print process according to the modification.

FIG. 11 is a flowchart illustrating an example of the flow of the print process according to the modification. The print process according to the modification is carried out by CPU 111 included in MFP 100 according to the modification as CPU 111 executes the image processing program. Referring to FIG. 11, CPU 111 determines whether a designation of data to be printed has been accepted (step S101). CPU 111 is in a standby mode until the designation of print data to be printed is accepted (NO in step S101), and once the designation of data to be printed is accepted, the process proceeds to step S102. That is, the print process according to the modification is a process executed provided that data to be printed is designated. When an operation for instructing printing is input in the state where a browsing program is being executed and a Web page is being displayed, the Web page that is being displayed is designated as the data to be printed. When an operation for instructing printing is input in the state where data stored in HDD 116 is designated, the designated data is designated as the data to be printed.

In step S102, it is determined whether the data to be printed is a structured document. If so, the process proceeds to step S103; otherwise, the process proceeds to step S117. In step S103, it is determined whether the data to be printed includes a moving image. If the data is a structured document including a moving image or is a structured document which links with a moving image, it is determined that the data includes a moving image. If the data to be printed includes a moving image, the process proceeds to step S104; otherwise, the process proceeds to step S117.

In step S104, the moving image is extracted. If the structured document includes a moving image, the moving image is extracted from the structured document. If the structured document links with a moving image, the linked moving image is acquired.

In step S105, moving image identification information is attached to the extracted moving image. In the following step S106, the moving image extracted from the structured document is stored in HDD 116 in association with the moving image identification information attached thereto. By doing so, when two or more moving images are included in the structured document, they can be stored in a distinguishable manner.

In step S107, it is determined whether an operation for designating a frame at which playback of the extracted moving image is to be started has been accepted. For example, in the state where the moving image is displayed on display portion 106A, if the user inputs an operation for stopping the playback, the operation is accepted as an operation for designating the frame that is being displayed at that time. If the operation for designating a frame is accepted, the process proceeds to step S108; otherwise, the process proceeds to step S109. In step S108, the designated frame is selected as a start frame, and the process proceeds to step S112.

On the other hand, in step S109, it is determined whether the structured document includes frame identification information. Specifically, it is determined whether the structured document includes the frame identification information for the start frame at which the playback of the moving image is to be started. If such frame identification information is included, the process proceeds to step S110; otherwise, the process proceeds to step S111. In step S110, the frame that is identified by the frame identification information included in the structured document is selected, and the process proceeds to step S112. In step S111, a first frame of the moving image is selected, and the process proceeds to step S112.

In step S112, a still image is generated in which the frame selected in step S108, S109, or S111 is arranged at the position, in the display image, where a moving image is displayed.

In step S113, it is determined whether the frame selected in step S108, S109, or S111 is the first frame. If the frame selected as the start frame is the first frame, the process proceeds to step S115; otherwise, the process proceeds to step S114.

In step S114, in the still image generated in step S112, the information about the position where the moving image is displayed in the still image, the moving image identification information attached to the moving image in step S105, and the frame identification information for the frame selected in step S108 or S110 are embedded as a watermark image, and the process proceeds to step S116. On the other hand, in step S115, in the still image generated in step S112, the information about the position where the moving image is displayed in the still image, and the moving image identification information attached to the moving image in step S105 are embedded as a watermark image, and the process proceeds to step S116.

In step S116, the still image is printed. Specifically, the still image is output to image forming portion 140 to cause it to form the still image on a sheet of paper. As a result, a still image overlaid with a watermark image that includes at least the positional information and the moving image identification information is formed on a sheet of paper.

On the other hand, in step S117, the data designated in step S101 is printed, and the process is finished.

As described above, the MFP according to the modification acquires a structured document including a moving image, stores the moving image included in the structured document by attaching thereto moving image identification information for identifying the moving image, generates a still image on which one frame selected from among a plurality of frames included in the moving image is arranged at a position, in a display image for displaying the structured document, where the moving image is displayed, embeds in the still image the moving image identification information and positional information which indicates the position at which the frame is arranged in the still image, and forms the still image on a sheet of paper. Furthermore, when reading a still image formed on a sheet of paper, the MFP extracts moving image identification information and positional information from the read still image, acquires a moving image identified by the moving image identification information, and generates a structured document in which the acquired moving image is associated with the still image in such a manner that the moving image is displayed at the position specified by the positional information in the still image.

Therefore, even in the case where an image of a structured document including a moving image is formed, when the sheet of paper on which the image has been formed is read, the moving image that has been stored at the time of forming the image can be specified. It is thus possible to form an image of a structured document without losing a moving image.

In the embodiment described above, in the case where the moving image identification information included in a still image includes device identification information, if the device identification information differs from the device identification information for the own device, the moving image extracted from the still image is not stored in HDD 116 of the own device. In this case, the moving image may be downloaded from one of MFPs 101 and 102 that is identified by the device identification information, or the still image may be transmitted to that device to cause it to reconfigure a structured document and the structured document may be received therefrom.

While MFPs 100, 101, and 102 have been described as examples of an image processing apparatus, the present invention may of course be understood as an image processing method for executing the processes shown in FIGS. 7 to 9 or in FIG. 11, or an image processing program for causing a computer to execute the image processing method.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

APPENDIX (1) The image processing system according to claim 6, wherein said changing portion changes a resolution of said moving image.

(2) The image processing system according to claim 6, wherein said changing portion changes image quality of said moving image.

The invention claimed is:

1. An image processing system including an image processing apparatus and a control apparatus for controlling the image processing apparatus, said control apparatus comprising:
a structured document acquiring portion to acquire a structured document including a moving image;
a print data generating portion to generate print data, the print data including a still image on which one frame selected from among a plurality of frames included in said moving image is arranged at a position, in a display image for displaying said acquired structured document, where said moving image is displayed, positional information indicating a position within said still image where said frame is arranged, and moving image identification information for identifying said moving image; and
a transmitting portion to transmit said generated print data and said moving image to said image processing apparatus,
said image processing apparatus comprising, in relation to image forming:
a receiving portion to receive said print data and said moving image from said control apparatus;
a storing portion to store said received moving image in association with said moving image identification information included in said print data;
an embedding portion to embed, in a still image included in said received print data, the moving image identification information for said stored moving image and said positional information included in said received print data; and
an image forming portion to form said still image on a recording medium,
said image processing apparatus further comprising, in relation to image reading:
a reading portion to read said still image formed on said recording medium;
an extracting portion to extract said moving image identification information and said positional information from said read still image;
a moving image acquiring portion to acquire a moving image identified by said extracted moving image identification information; and
a reconfiguration portion to generate a structured document in which said acquired moving image is associated with said read still image in such a manner that said moving image is displayed at a position, in said still image, that is specified by said extracted positional information.

2. The image processing system according to claim 1, said control apparatus further comprising a select instruction accepting portion to accept an instruction to select a frame from within said moving image, wherein
said print data generating portion generates the print data including the still image on which the frame selected by said accepted instruction from among the plurality of frames included in said moving image is arranged at the position, in the display image for displaying said acquired structured document, where said moving image is displayed.

3. The image processing system according to claim 1, wherein in the case where a start frame at which playback of said moving image is to be started is set in said acquired structured document, said print data generating portion generates the print data including the still image on which said start frame among the plurality of frames included in said moving image is arranged.

4. The image processing system according to claim 1, wherein
said print data generating portion generates the print data which further includes frame identification information for identifying a frame arranged in said still image,
said embedding portion further embeds said frame identification information included in said received print data, in the still image included in said received print data,
said extracting portion further extracts said frame identification information from said read still image, and
said reconfiguration portion includes a setting portion to set a start frame such that, when said generated structured document is displayed, the playback of said moving image is started at the frame identified by said extracted frame identification information.

5. The image processing system according to claim 1, wherein
said reconfiguration portion includes
a display setting accepting portion to accept display setting for displaying said moving image, and
a setting portion to set a start frame such that, when said generated structured document is displayed, the playback of said moving image is started at a frame specified by said accepted display setting.

6. The image processing system according to claim 1, wherein
said reconfiguration portion includes
a display setting accepting portion to accept display setting for displaying said moving image, and
a changing portion to change said moving image such that said moving image is played back in accordance with said accepted display setting.

7. An image processing apparatus comprising:
a structured document acquiring portion to acquire a structured document including a moving image;
a storing portion to store said moving image included in said acquired structured document by attaching thereto moving image identification information for identifying the moving image;
a still image generating portion to generate a still image on which one frame selected from among a plurality of frames included in said moving image is arranged at a position, in a display image for displaying said acquired structured document, where said moving image is displayed;
an embedding portion to embed, in said generated still image, said moving image identification information and positional information indicating a position within said still image where said frame is arranged;
an image forming portion to form said still image on a recording medium;
a reading portion to read said still image formed on said recording medium;
an extracting portion to extract said moving image identification information and said positional information from said read still image;
a moving image acquiring portion to acquire a moving image identified by said extracted moving image identification information; and
a reconfiguration portion to generate a structured document in which said acquired moving image is associated with said read still image in such a manner that said moving image is displayed at a position, in said still image, that is specified by said extracted positional information.

8. The image processing apparatus according to claim 7, further comprising a select instruction accepting portion to accept an instruction to select a frame from within said moving image, wherein
said still image generating portion generates the still image on which the frame selected by said accepted instruction from among the plurality of frames included in said moving image is arranged at the position, in the display image for displaying said acquired structured document, where said moving image is displayed.

9. The image processing apparatus according to claim 7, wherein in the case where a start frame at which playback of said moving image is to be started is set in said acquired structured document, said still picture generating portion generates the still image on which said start frame among the plurality of frames included in said moving image is arranged.

10. The image processing apparatus according to claim 7, wherein
said embedding portion further embeds, in said generated still image, frame identification information for identifying a frame arranged in the still image,
said extracting portion further extracts said frame identification information from said read still image, and
said reconfiguration portion includes a setting portion to set a start frame such that, when said generated structured document is displayed, the playback of said moving image is started at the frame identified by said extracted frame identification information.

11. The image processing apparatus according to claim 7, wherein
said reconfiguration portion includes
a display setting accepting portion to accept display setting for displaying said moving image, and
a setting portion to set a start frame such that, when said generated structured document is displayed, the playback of said moving image is started at a frame specified by said accepted display setting.

12. The image processing apparatus according to claim 7, wherein
said reconfiguration portion includes
a display setting accepting portion to accept display setting for displaying said moving image, and
a changing portion to change said moving image such that said moving image is played back in accordance with said accepted display setting.

13. An image processing method comprising the steps of:
acquiring a structured document including a moving image;
storing said moving image included in said acquired structured document;
generating a still image on which one frame selected from among a plurality of frames included in said moving image is arranged at a position, in a display image for displaying said acquired structured document, where said moving image is displayed;
embedding, in said generated still image, said moving image identification information and positional information indicating a position within said still image where said frame is arranged;
forming said still image on a recording medium;
reading said still image formed on said recording medium;
extracting said moving image identification information and said positional information from said read still image;
acquiring a moving image identified by said extracted moving image identification information; and generating a structured document in which said acquired moving image is associated with said read still image in such a manner that said moving image is displayed at a position, in said still image, that is specified by said extracted positional information.

14. A non-transitory computer readable recording medium recorded with an image processing program, the program causing a computer to perform the steps of:

acquiring a structured document including a moving image;

storing said moving image included in said acquired structured document;

generating a still image on which one frame selected from among a plurality of frames included in said moving image is arranged at a position, in a display image for displaying said acquired structured document, where said moving image is displayed;

embedding, in said generated still image, said moving image identification information and positional information indicating a position within said still image where said frame is arranged;

forming said still image on a recording medium;

reading said still image formed on said recording medium;

extracting said moving image identification information and said positional information from said read still image;

acquiring a moving image identified by said extracted moving image identification information; and generating a structured document in which said acquired moving image is associated with said read still image in such a manner that said moving image is displayed at a position, in said still image, that is specified by said extracted positional information.

* * * * *